No. 710,157. Patented Sept. 30, 1902.
L. W. KYES.
AXLE.
(Application filed July 11, 1901.)
(No Model.) 2 Sheets—Sheet I.

Witnesses:
K. H. Hansen
Helen H. O'hull

Inventor:
Lewis W. Kyes.
by: Stryker & Bradbury
Attorneys.

No. 710,157. Patented Sept. 30, 1902.
L. W. KYES.
AXLE.
(Application filed July 11, 1901.)
(No Model.) 2 Sheets—Sheet 2.
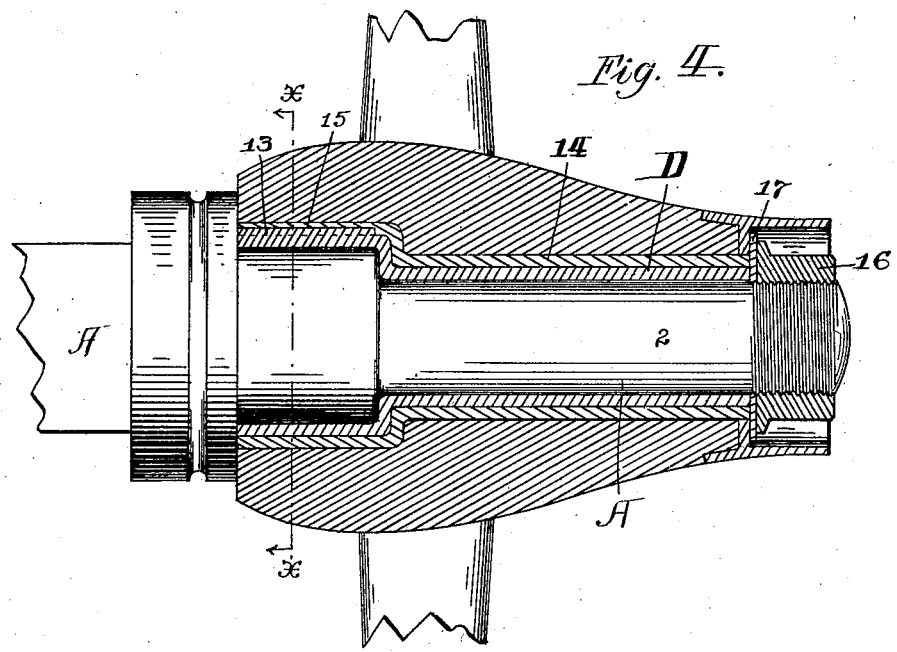
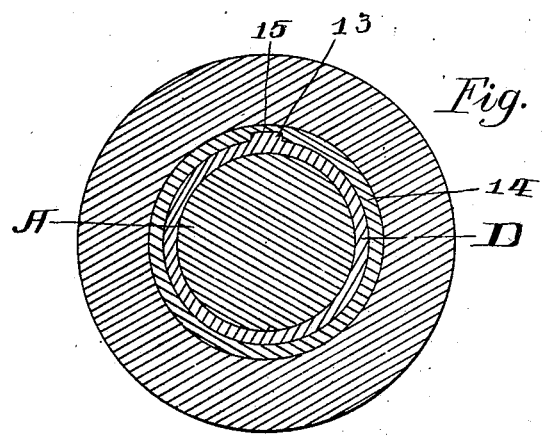
Witnesses:
Inventor:
Lewis W. Kyes.
by Attorneys.

UNITED STATES PATENT OFFICE.

LEWIS W. KYES, OF HAMMOND, WISCONSIN.

AXLE.

SPECIFICATION forming part of Letters Patent No. 710,157, dated September 30, 1902.

Application filed July 11, 1901. Serial No. 67,840. (No model.)

*To all whom it may concern:*

Be it known that I, LEWIS W. KYES, a citizen of the United States of America, and a resident of Hammond, in the county of St. Croix and State of Wisconsin, have invented certain new and useful Improvements in Axles, of which the following is a specification.

My invention relates to improvements in wagon-axles.

The object of my invention is to provide ordinary axles with a journal-bearing that may be easily replaced at a slight expense when worn out and by which friction between the working parts is reduced to a minimum.

With axles now in general use the journal is made of iron or steel, which is replaced when worn out by cutting the worn part off and attaching a new piece by welding. This is expensive and results in loss of time and labor.

My invention consists, primarily, of a journal-sleeve which is inserted between the axle and the hub of the wheel and attached to one or the other of said parts.

Figure 1:
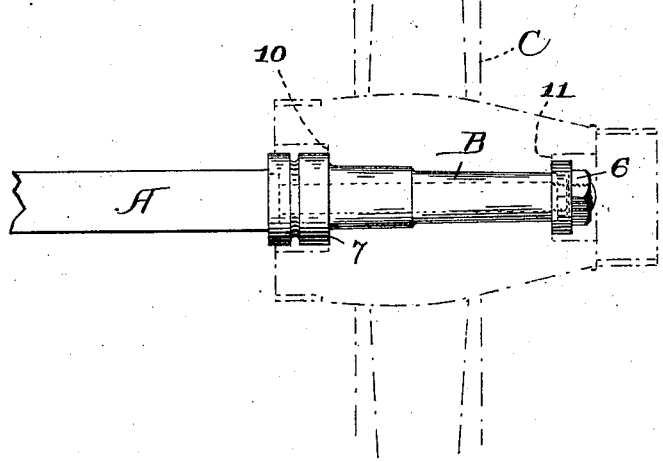
Figure 2:
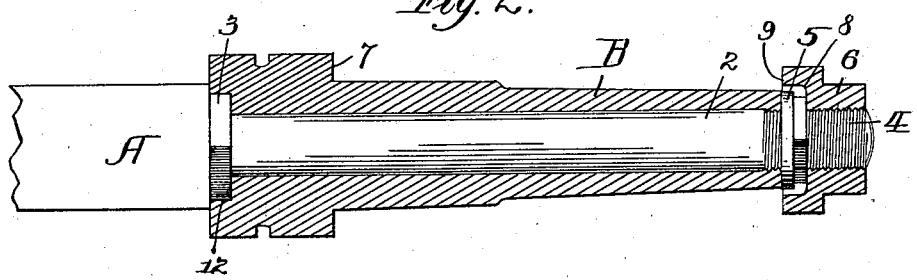
Figure 3:
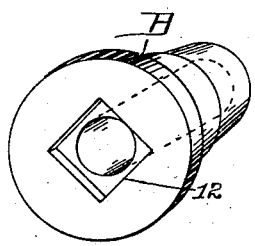

In the accompanying drawings, forming part of this specification, Figure 1 is a side view of my invention, showing the hub of the wheel. (Indicated by broken lines.) Fig. 2 is a longitudinal section of my invention shown attached to the axle. Fig. 3 is a perspective view of the journal-sleeve. Fig. 4 is a longitudinal section of the alternate form of my invention, showing the sleeve attached to the hub of the wheel, which is in position upon the axle; and Fig. 5 is a section of Fig. 4, taken on the line X X.

In the drawings let A represent an ordinary axle, B the journal-sleeve, and C a wheel, which is shown in broken lines in Fig. 1. The axle is formed with the shank 2, which is provided with a square shoulder 3, adjoining its inner end to prevent turning of the sleeve B. The outer end of the shank is threaded at 4 to receive the nuts 5 and 6. The sleeve is adapted to slip over the shank and the shoulder 3 of the shank-sockets into the recess 12 of the sleeve. The hub of the wheel journals on the sleeve and is prevented from moving longitudinally on the shank by means of the shoulder 7 on the sleeve and the shoulder 9 on the nut 6. The nut 5 holds the sleeve on the shank and is prevented from unscrewing by the nut 6, which screws against it. The journal-sleeve may be constructed of brass or any other suitable material for reducing friction between the working parts. It is obvious that by the use of my journal-sleeve it is practical to use anti-friction metal, whereas in axles now in general use it is necessary to use steel or iron in order to weld the parts together. In use the sleeve is locked on the shank and the wheel held on the sleeve by means of the nuts 5 and 6. When the sleeve becomes worn, it may easily be removed by loosening the nuts and replaced by a new sleeve. In the alternate construction the sleeve D revolves with the wheel instead of remaining stationary on the axle, as in the preferred construction. The sleeve is attached to the hub of the wheel by means of the web 13, which is formed on the outer surface near the inner end of the sleeve. The journal-shell 14 of the hub, which is of ordinary construction, is slotted at 15 to receive the web. The nut 16 and washer 17 hold the hub and sleeve in position on the shank 2.

Having described my invention, what I claim as new, and desire to protect by Letters Patent, is—

1. A device of the class described, consisting in combination of a wheel-hub journaled on a shank, a stationary sleeve between said shank and hub, a shoulder on the inner end of said sleeve, a nut threaded on said shank and impinging against the outer end of said sleeve, and a second nut locked against the first nut; said second nut having an annular shoulder projecting against the outer end of said hub.

2. A device of the class set forth, consisting in combination with a wheel-hub and a shank, of an antifriction-sleeve between said shank and hub, a shoulder between the inner end of said sleeve and shank for preventing longitudinal movement of said sleeve, a nut threaded on said shank and impinging against the outer end of said sleeve, and a second nut locked against said first nut; said second nut having an annular shoulder adapted to impinge against the outer end of said hub.

In testimony whereof I have signed my name to this specification in the presence of two subscribing witnesses.

LEWIS W. KYES.

Witnesses:
JOHN E. STRYKER,
HELEN H. O'NEILL.